(12) United States Patent
Dou et al.

(10) Patent No.: US 8,891,669 B2
(45) Date of Patent: *Nov. 18, 2014

(54) NONLINEAR COMPENSATING APPARATUS AND METHOD AND TRANSMITTER

(71) Applicant: Fujitsu Limited, Kawasaki (JP)

(72) Inventors: Liang Dou, Beijing (CN); Zhenning Tao, Beijing (CN)

(73) Assignee: Fujitsu Limited, Kawaski (JP)

(*) Notice: Subject to any disclaimer, the term of this patent is extended or adjusted under 35 U.S.C. 154(b) by 267 days.

This patent is subject to a terminal disclaimer.

(21) Appl. No.: 13/627,563

(22) Filed: Sep. 26, 2012

(65) Prior Publication Data

US 2013/0077979 A1 Mar. 28, 2013

(30) Foreign Application Priority Data

Sep. 26, 2011 (CN) .......................... 2011 1 0288839

(51) Int. Cl.
 *H04L 25/03* (2006.01)
 *H04B 10/2543* (2013.01)

(52) U.S. Cl.
 CPC ................................. *H04B 10/2543* (2013.01)
 USPC ....................................................... 375/296

(58) Field of Classification Search
 CPC .......... H03K 9/00; H04B 10/00; H04B 10/04; H04B 10/18; H04B 10/25; H04B 10/58; H04B 15/00; H04J 14/06; H04L 5/12; H04L 25/03; H04L 25/49; H04L 27/00
 USPC .................. 370/201; 375/254, 260, 296, 316; 398/28, 38, 149, 152, 192, 193, 208; 702/86
 See application file for complete search history.

(56) References Cited

U.S. PATENT DOCUMENTS

| | | | |
|---|---|---|---|
| 2005/0163250 A1* | 7/2005 | McCallister | 375/296 |
| 2007/0036238 A1* | 2/2007 | Matero et al. | 375/296 |
| 2009/0225899 A1* | 9/2009 | Dent | 375/296 |
| 2011/0229143 A1* | 9/2011 | Buelow et al. | 398/116 |
| 2012/0281981 A1* | 11/2012 | Le Taillandier De Gabory et al. | 398/29 |

* cited by examiner

*Primary Examiner* — Sam K Ahn
*Assistant Examiner* — Shawkat M Ali
(74) *Attorney, Agent, or Firm* — Staas & Halsey LLP

(57) ABSTRACT

The present invention provides a nonlinear compensating apparatus and method and a transmitter. The nonlinear compensating apparatus includes: an information sequence acquiring unit, configured to acquire a symbol information sequence of the pulse signal; a perturbation quantity acquiring unit, configured to calculate the weighted sum of interaction items of pulses on one or more moments relative to the current moment, to obtain the perturbation quantity produced on a transmission link with a certain length, and rotate the obtained perturbation quantity by a predetermined phase; and an information compensating unit, configured to calculate the difference between the symbol information sequence and the perturbation quantity to obtain a compensated symbol information sequence. With the embodiments of the present invention, the performance of the system, especially the performance of NRZ (Not Return to Zero) code, may be further improved.

9 Claims, 6 Drawing Sheets

NONLINEAR COMPENSATING APPARATUS AND METHOD AND TRANSMITTER

CROSS REFERENCE TO RELATED APPLICATIONS

This application is claims the benefit of Chinese Application No. 201110288839.6, filed Sep. 26, 2011, the disclosure of which is incorporated herein by reference.

TECHNICAL FIELD

The present invention relates to the field of optical communication, and in particular to an intra-channel nonlinear compensating apparatus and method and a transmitter.

BACKGROUND ART

The intra-channel nonlinearity is inherent damage in an optical transmission system and is originated from the Kerr effect. When the rate of the single channel reaches 40-60 Gbits/s or more, the pulses within the same channel will be greatly widened and overlapped each other due to the effect of dispersion, and with the effect of the nonlinearity, energy exchange will occur between the overlapped pulses. In such a case, even though the residual dispersion in the link was compensated for at the receiving side, the system would still be severely nonlinearly damaged. The effect of nonlinearity within the channel on the system includes: timing jitter, signal amplitude fluctuation, and generation of ghost pulse.

In recent years, as the rise of the capacities of optical transmission systems, more complex multidimensional modulation technologies, instead of simple intensity modulation formats, have been a hot spot in studies. For ensuring that a complex modulation has a sufficient signal to noise ratio, it is needed that a link system has higher input power, and this undoubtedly results in the increase of cost of nonlinearity of the system.

For a long-haul optical communication system, how to compensate for or mitigate the cost of nonlinearity within a channel is an important question for study. Studies have been done with respect to design of link, DSP processing of receiver and coding of transmitting signal. A method for mitigating nonlinearity by subtracting nonlinear perturbation at a receiver side has been proposed in the prior art. Such a method is based on double oversampling, wherein a perturbation item is equal to a weighted sum of products of a series of three items (symbol information data of three moments), and the weighted value is decided by the dispersion, gain/attenuation and nonlinear coefficient of the link. The advantage of the method exists in the reduction of complexity, and especially in a PSK system, a pre-compensated waveform may completely be realized by means of addition and subtraction.

However, in the implementation of the present invention, the inventors found the disadvantages of the prior art exist in: the performance is not good for NRZ (Not Return to Zero) code, and the performance of the system needs to be further improved.

Following documentations are listed for better understanding of the present invention and the prior art, which are incorporated herein by reference, as they are fully stated herein.

[Reference 1]: IEEE PTL Vol. 12, No. 4, 2000, Antonio Mecozzi et. al.

[Reference 2]: L. Dou, Z. Tao, L. Li, W. Yan, T. Tanimura, T. Hoshida, and J. C. Rasmussen, "A low complexity pre-distortion method for intra-channel nonlinearity," in *Proc. OFC/NFOEC*2011 *Conf.*, Los Angeles, U.S.A., March. 2011, paper OThF5.

SUMMARY OF THE INVENTION

The embodiments of the present invention provide a nonlinear compensating apparatus and method and a transmitter, with an object to further improve the performance of the system, especially the performance of NRZ (Not Return to Zero) codes.

According to an aspect of the embodiments of the present invention, there is provided a nonlinear compensating apparatus, includes:

an information sequence acquiring unit, configured to acquire a symbol information sequence of the pulse signal inputted by a transmitting side;

a perturbation quantity acquiring unit, configured to calculate the weighted sum of interaction items of pulses on one or more moments relative to the current moment, so as to obtain the perturbation quantity produced on a transmission link with a certain length, and rotate the obtained perturbation quantity by a predetermined phase; and an information compensating unit, configured to calculate the difference between the symbol information sequence and the perturbation quantity to obtain a compensated symbol information sequence, so as to cause the transmitting side to transmit signals according to the compensated symbol information sequence.

According to another aspect of the embodiments of the present invention, there is provided a nonlinear compensating method, includes:

an information sequence acquiring step, for acquiring a symbol information sequence of the pulse signal inputted by a transmitting side;

a perturbation quantity acquiring step, for calculating the weighted sum of interaction items of pulses on one or more moments relative to the current moment, so as to obtain the perturbation quantity produced on a transmission link with a certain length, and rotating the perturbation quantity by a predetermined phase; and an information compensating step, for calculating the difference between the symbol information sequence and the perturbation quantity to obtain a compensated symbol information sequence, so as to cause the transmitting side to transmit signals according to the compensated symbol information sequence.

According to still another aspect of the embodiments of the present invention, there is provided a transmitter, includes the nonlinear compensating apparatus as stated above, wherein the transmitter further includes:

a pulse shaping unit, configured to perform pulse shaping based on the compensated symbol information sequence obtained by the nonlinear compensating apparatus, to obtain the waveform of each pulse; and a signal transmitter, configured to receive the waveform of each pulse transmitted by the pulse shaping unit, then modulating and transmitting the waveforms.

The advantages of the embodiments of the present invention exist in: the symbol information of the pulse signals inputted by a transmitting side may be compensated for, and if the apparatus is applied in a transmitter, the transmitter can shape and modulate the pulses by using the compensated symbol information, and then transmit the signals; and after these signals are subjected to the nonlinear effect of optical fiber transmission, ideal undamaged signals are obtained at the receiver.

And the performance, especially the performance of NRZ (Not Return to Zero) code, may be further improved, by calculating a weighted sum of interactions of the pulses on one or more moments and compensating for the original information sequence after phase rotating the obtained perturbation quantity; and the calculation method is simple, applicable to single polarization and polarization multiplexing systems, and at the same time, compatible with any modulation formats.

These and further aspects and features of the present invention will be apparent with reference to the following description and attached drawings. It is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF THE INVENTION

Various embodiments of the present invention are described as follows in reference to the drawings. These embodiments are illustrative only, and are not intended to limit the present invention. For the easy understanding of the principles and embodiments of the present invention by those skilled in the art, the embodiments of the present invention shall be described taking an optical communication system as an example. However, it should be noted that the embodiments of the present invention are applicable to all the communication systems in which there exists nonlinear loss.

Figure 1:
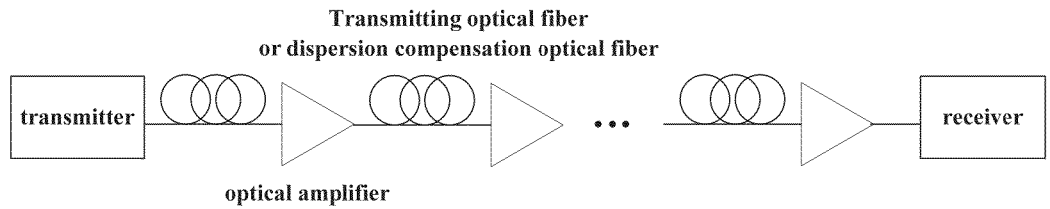
FIG. 1 is a schematic diagram of a typical optical communication system.

FIG. 1 is a schematic diagram of a typical optical communication system, in which the signal transmitted by a transmitter passes different devices (such as an optical fiber, an optical amplifier, and a dispersion compensation optical fiber, etc.) in a transmission link and reaches a receiver. In the embodiments of the present invention, the symbol information sequences of the inputted pulse signals are compensated for at the transmitting side by a nonlinear compensating apparatus, such that the transmitting side transmits specifically-deformed signals, and after these signals are subjected to the nonlinear effect of optical fiber transmission, ideal undamaged signals are obtained at the receiver.

In the system shown in FIG. 1, in order that received signals can be compensated for at the transmitting side, the inventors first modeled intra-channel nonlinearity in the implementation of the present invention, and then compensated for the input pulse signals according to the nonlinear model.

In normal conditions, polarization multiplexing is often used at the transmitter side, so as to increase the spectrum efficiency to the greatest extent. Hence, a process of obtaining an intra-channel nonlinear model is described below taking dual polarization as an example.

First, for a vector signal, the transmission optical fiber may be modeled as a Manakov equation, as shown by formula (1) below:

$$\frac{\partial}{\partial z}u_H(t, z) + \frac{\alpha(z)}{2}u_H(t, z) + j\frac{\beta_2(z)}{2}\frac{\partial^2}{\partial t^2}u_H(t, z) = \qquad (1)$$
$$j\gamma(z)[|u_H(t, z)|^2 + |u_V(t, z)|^2]u_H(t, z)$$

$$\frac{\partial}{\partial z}u_V(t, z) + \frac{\alpha(z)}{2}u_V(t, z) + j\frac{\beta_2(z)}{2}\frac{\partial^2}{\partial t^2}u_V(t, z) =$$
$$j\gamma(z)[|u_V(t, z)|^2 + |u_H(t, z)|^2]u_V(t, z)$$

where, $u_H(t, z)$ and $u_V(t, z)$ are electrical field components of the signal at the horizontal H and vertical V polarization states, respectively, and $\alpha(z)$, $\beta_2(z)$ and $\gamma(z)$ denote respectively distributions of attenuation coefficient, dispersion coefficient and nonlinearity coefficient in the optical link along the transmission distance.

Second, as the signals generated by the transmitter usually consist of optical pulses, the electrical field components at the transmitter side may be in the form expressed by formula (2) below:

$$u_H(t, z = 0) = \sum_k A_k^H g(t - kT) \qquad (2)$$

$$u_V(t, z = 0) = \sum_k A_k^V g(t - kT)$$

where, $A_k^H$ and $A_k^V$ are information symbols of the k(th) pulse at the horizontal H and vertical V polarization states, respectively, T is the pulse interval, and g(t) is the waveform of each of the pulses. It should be pointed out here that even though the output signals transmitted by the transmitter are of any waveforms, the output signals may still be deemed as being in the form expressed by formula (2), only if the time interval T is set sufficiently small.

Last, formula (1) is substituted by formula (2), in a case where the input power is not extremely great (that is, the nonlinearity of the optical link is not very intense), formula (1) may be solved by using the perturbation theory, and formula (3) is obtained:

$$u_H(t = kT, z = L) = u_H(t = kT, 0) + \qquad (3)$$
$$\sum_{m,n}\{[A_{m+k}^H A_{n+k}^H (A_{m+n+k}^H)^* + A_{m+k}^H A_{n+k}^V (A_{m+n+k}^V)^*]C(m, n, z = L)\}$$

-continued $$u_V(t = kT, z = L) = u_V(t = kT, 0) +$$
$$\sum_{m,n}\{[A_{m+k}^V A_{n+k}^V (A_{m+n+k}^V)^* + A_{m+k}^V A_{n+k}^H (A_{m+n+k}^H)^*]C(m, n, z = L)\}$$

Where, in formula (3), the electrical field value at the k(th) pulse sampling moment at the receiver side consists of the electrical field value and perturbation quantity of the k(th) pulse at the transmitting side, and wherein, the perturbation quantity is a weighted sum of a plurality of interaction items, each item being a product of transmitting pulse information symbols on one or more moments. Where, in the process of solving formula (1) by using the perturbation theory, low-order items are taken and high-order items are neglected in calculation.

Hence, a weighted sum of interactions of the pulses at three moments, the (m+k)th moment, the (n+k)th moment and the (m+n+k)th moment, relative to the k(th) pulse sampling moment, is only needed to be calculated for formula (3). However, if high-order items are taken into consideration in the solving process, a weighted sum of interactions of the pulses at more than three moments relative to the k(th) pulse sampling moment needs to be calculated.

The pulses at three moments used for the k(th) pulse are not arbitrary, and the temporal relationship between them satisfies formula (m+k)+(n+k)−(m+n+k)=k. Where, m, n and k may be equal, i.e. the pulse sampling moment may be one or more moments relative to the current moment. It should be noted that the present invention is not limited thereto, and these three pulses may have other forms of combination, with the coefficients corresponding to them needing to be modified accordingly.

Following description is given taking a weighted sum of interactions of three pulses as an example. It should be noted that the present invention is not limited thereto, and the case where there are more than three pulses is similar to the case where there are three pulses.

It can be seen from formula (3) that the perturbation item at the current polarization state is originated from two parts, and one part is originated from the present polarization state, and the other part is originated from an orthogonal polarization state. For example, for the horizontal polarization state, the part originated from the local polarization state is $A_{m+k}^H A_{n+k}^H (A_{m+n+k}^H)^*$, and the part originated from the orthogonal polarization state is $A_{n+k}^H A_{n+k}^V (A_{m+n+k}^V)^*$. The case of a vertical polarization state is similar to this, which shall not be described any further.

Since the symbol information of two polarization states always appears symmetrically in Manakov equation (1), such symmetry finally results in that the coefficients of the two parts of perturbation items of horizontal and vertical polarization states are identical. These coefficients are only related to the configuration of the link and the relative positions (m, n) of the interacted pulses and the pulse at the current moment.

On the basis of the above nonlinear model, specifically deformed signals are transmitted at the transmitting side, and after these signals are subjected to the nonlinear effect of optical fiber transmission, ideal undamaged signals are obtained at the receiving side. Where, it is assumed that the linear damage of the channel has been compensated for in other ways.

Furthermore, formula (4) below may be obtained in an equal-order way by sorting formula (3):

$$u_H(t = kT, z = L) = A_k^H + \quad (4)$$
$$A_k^H\left[\sum_n (2|A_{n+k}^H|^2 + |A_{n+k}^V|^2)C(0, n, z = L) - |A_k^H|^2 C(0, 0, z = L)\right] +$$
$$\sum_{mn\neq 0}[A_{m+k}^H A_{n+k}^H (A_{m+n+k}^H)^* + A_{m+k}^H A_{n+k}^V (A_{m+n+k}^V)^*]C(m, n, z = L) +$$
$$\sum_{m\neq 0} A_{m+k}^H A_k^V (A_{m+k}^V)^* C(m, 0, z = L)$$

$$u_V(t = kT, z = L) = A_k^V +$$
$$A_k^V\left[\sum_n (2|A_{n+k}^V|^2 + |A_{n+k}^H|^2)C(0, n, z = L) - |A_k^V|^2 C(0, 0, z = L)\right] +$$
$$\sum_{mn\neq 0}[A_{m+k}^V A_{n+k}^V (A_{m+n+k}^V)^* + A_{m+k}^V A_{n+k}^H (A_{m+n+k}^H)^*]C(m, n, z = L) +$$
$$\sum_{m\neq 0} A_{m+k}^V A_k^H (A_{m+k}^H)^* C(m, 0, z = L)$$

As to formula (4), both the second items to the right of the equal marks contain current symbol information $A_k^H$ or $A_k^V$, and multiplicative operation is performed on the current symbol. When mn=0, the imaginary part of the coefficient C(m,n) is much greater than the real part, hence, it can be approximately considered as a pure imaginary number. In consideration of exp(jθ)≈1+jθ, the second items in formula (4) may be deemed as an angular rotational operation; and both of the last two items do not contain the current symbol information, and are additive perturbations.

For PSK signals, as the modulus of every symbol are identical, the factor of the second item to the right side of the equal mark in formula (4) that is multiplied on the current symbol information is a constant. In consideration that such a factor is an imaginary number, the result seen at the receiving side is a whole rotation of a constellation. Since a coherent receiver often has a phase recovery algorithm, such a rotation may be completely corrected.

Hence, in considering the actual effect of nonlinearity, the effect of such an item may be neglected, that is, the symbol information of the current moment may be discarded, and only the effect of the last two additive perturbations at the right side of the equal mark in formula (4) is considered. Therefore, formula (4) may be further rewritten into formula (5):

$$u_H'(t = kT, z = L) = u_H(t = kT, 0) + \Delta_k^H = \quad (5)$$
$$A_k^V + \left\{\sum_{mn\neq 0}\begin{bmatrix}A_{m+k}^H A_{n+k}^H (A_{m+n+k}^H)^* + \\ A_{m+k}^H A_{n+k}^V (A_{m+n+k}^V)^*\end{bmatrix}C(m, n, z = L) + \sum_{m\neq 0} A_{m+k}^H A_k^V (A_{m+k}^V)^* C(m, 0, z = L)\right\}$$

$$u_V'(t = kT, z = L) = u_V(t = kT, 0) + \Delta_k^V =$$
$$A_k^V + \left\{\sum_{mn\neq 0}\begin{bmatrix}A_{m+k}^V A_{n+k}^V (A_{m+n+k}^V)^* + \\ A_{m+k}^V A_{n+k}^H (A_{m+n+k}^H)^*\end{bmatrix}C(m, n, z = L) + \sum_{m\neq 0} A_{m+k}^V A_k^H (A_{m+k}^H)^* C(m, 0, z = L)\right\}$$

For other non-constant modulus modulation signals, such as quadrature amplitude modulation (QAM) or orthogonal frequency division multiplexing (OFDM), when the accumulated dispersion on the link is very large, the number of interacted pulses is very great; and due to an average effect, the phase rotations introduced by the nonlinearity are approximately equal and therefore, formula (5) is still valid. An additive distortion introduced by the nonlinearity is only taken into consideration in formula (5). For polarization multiplexed signals, the perturbation is originated from the present polarization state and the orthogonal polarization state.

The above description is given taking dual polarization signals as an example. If single polarization signals are transmitted in the channel, formula (5) may be further simplified into formula (6):

$$u'(t = kT, z = L) = \qquad (6)$$
$$u(t = kT, 0) + \Delta_k = A_k + \sum_{mn \neq 0} A_{m+k} A_{n+k} A^*_{m+n+k} C(m, n, z = L)$$

On the basis of the above analysis, the nonlinear compensating apparatus and method and transmitter of the embodiments of the present invention shall be described in detail, taking the optical communication system shown in FIG. 1 and the nonlinear model based on the communication system as an example.

Figure 2:
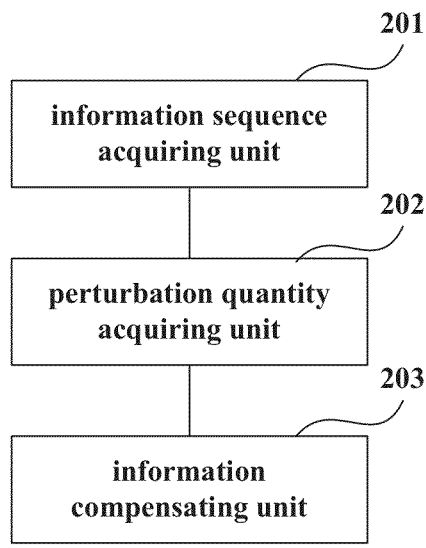
FIG. 2 is a schematic diagram of the nonlinear compensating apparatus of the embodiments of the present invention.

FIG. 2 is a schematic diagram of the nonlinear compensating apparatus of the embodiments of the present invention. As shown in FIG. 2, the nonlinear compensating apparatus includes an information sequence acquiring unit 201, a perturbation quantity acquiring unit 202 and an information compensating unit 203.

Where, the information sequence acquiring unit 201 is used for acquiring a symbol information sequence of the pulse signal inputted by a transmitting side; the perturbation quantity acquiring unit 202 is used for calculating the weighted sum of interaction items of pulses on one or more moments relative to the current moment, to obtain the perturbation quantity produced on a transmission link with a certain length and rotating the obtained perturbation quantity by a predetermined phase; and the information compensating unit 203 is used for calculating the difference between the symbol information sequence and the perturbation quantity to obtain a compensated symbol information sequence, so as to cause the transmitting side to transmit signals according to the compensated symbol information sequence.

In this embodiment, the symbol information sequence obtained by the information sequence acquiring unit 201 is symbol information before compensation; where the symbol information is related to the used modulation format, and the symbol information is different for different modulation formats. For example, for the OOK modulation format, the symbol information sequence is 0, 1; for the BPSK modulation format, the symbol information sequence is −1, 1; and for the QPSK modulation format, the symbol information sequence is 1, j, −1, −j.

In this embodiment, the perturbation quantity acquiring unit 202 may be used for calculating a perturbation quantity for each transmitting symbol (transmitting moment), the perturbation quantity being equal to a weighted sum of a plurality of interacted items, where each of the interacted items refers to a product of one or more different symbols.

In this embodiment, the information compensating unit 203 may be particularly used for obtaining a compensated symbol information sequence of the current moment by subtracting the phase-rotated perturbation quantity obtained by the perturbation quantity acquiring unit 202 from the symbol information sequence obtained by the information sequence acquiring unit 201.

In particular implementation, a corresponding hardware circuit may be used, which may be implemented by an adder, a multiplier, or a logic operation circuit, etc. For example, for PSK signals, the multiplication between the symbols may be realized by a lookup table, and the multiplication between PSK signals and the Coef may be realized by logic operation and an adder. Existing elements may be used in implementation, which shall not be described any further.

It can be seen from the above embodiment that the nonlinear compensating apparatus may compensate for the symbol information of the pulse signals inputted by a transmitting side, and if the apparatus is applied in a transmitter, the transmitter can shape and modulate the pulses by using the compensated symbol information, and then transmit the signals; and after these signals are subjected to the nonlinear effect of optical fiber transmission link, ideal undamaged signals are obtained at the receiver.

And the nonlinear compensating apparatus may further improve the performance by calculating a weighted sum of interactions of the pulses on one or more moments and compensating for the original information sequence after phase rotating the perturbation quantity; and the calculation method is simple, applicable to single polarization and polarization multiplexing systems, and at the same time, compatible with any modulation formats.

Figure 3:
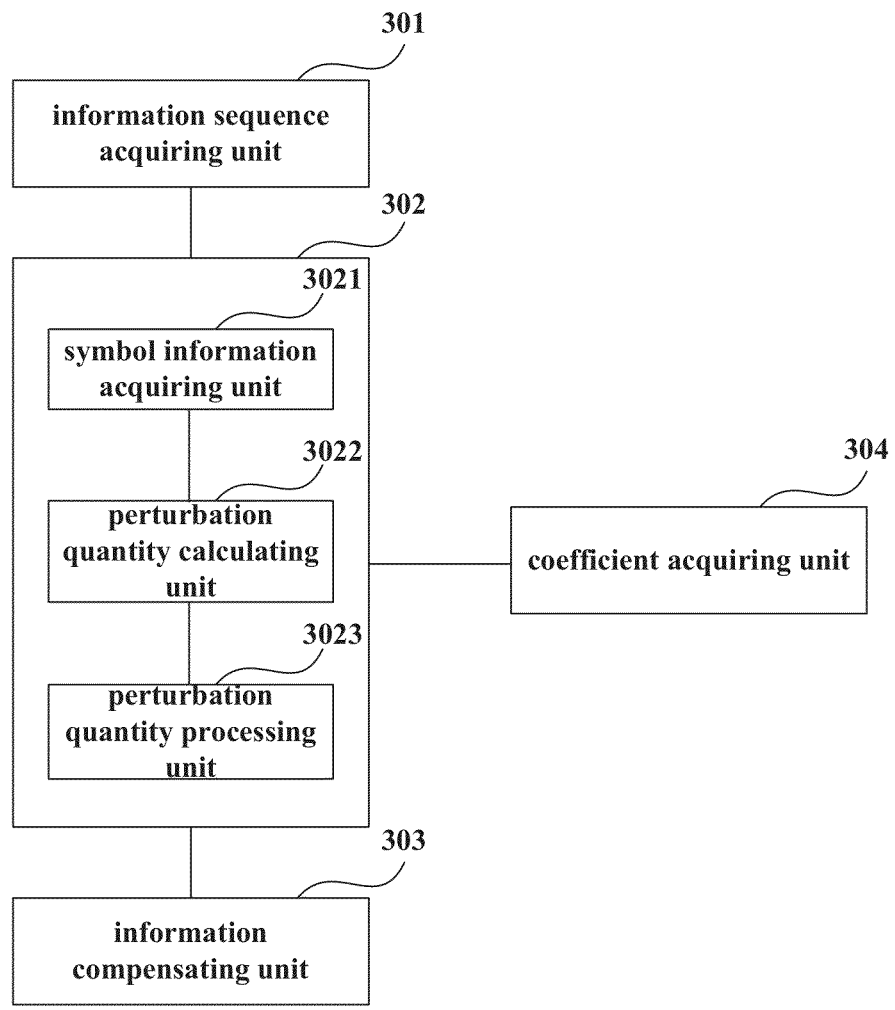
FIG. 3 is another schematic diagram of the nonlinear compensating apparatus of the embodiments of the present invention.

FIG. 3 is another schematic diagram of the nonlinear compensating apparatus of the embodiments of the present invention. As shown in FIG. 3, the nonlinear compensating apparatus includes: an information sequence acquiring unit 301, a perturbation quantity acquiring unit 302, and an information compensating unit 303, with their functions being similar to those of the corresponding parts of the nonlinear compensating apparatus shown in FIG. 2, which shall not be described any further.

In this embodiment, the perturbation quantity acquiring unit 302 may use the following construction to calculate and process the perturbation quantity. As shown in FIG. 3, the perturbation quantity acquiring unit 302 may particularly include a symbol information acquiring unit 3021, a perturbation quantity calculating unit 3022 and a perturbation quantity processing unit 3023.

Where, the symbol information acquiring unit 3021 is used for acquiring symbol information of the pulses for each of multiple interaction items of the pulses on one or more moments relative to the current moment;

the perturbation quantity calculating unit 3022 is used for calculating the weighted value of the interactions of pulses of each item on one or more moments relative to the current moment by using the symbol information of the pulses of each item on one or more moments relative to the current moment and a pre-obtained weighted coefficient to which each item corresponds, and calculating the sum of the weighted values of the multiple interaction items of pulses according to the weighted value of each item, so as to obtain the perturbation quantity produced on a transmission link with a certain length; and the perturbation quantity processing unit 3023 is used for rotating the obtained perturbation quantity by a predefined phase.

Furthermore, the perturbation quantity calculating unit 3022 may discard products of those three items including the symbol information of the current moment, so as to obtain the perturbation quantity produced on a transmission link with a certain length, thereby further simplifying the calculation. It is applicable to single polarization and polarization multiplexing systems, and at the same time, compatible with any modulation formats, especially a non-constant modulus modulation signal system of non-QPSK, such as QAM or OFDM, etc.

Following description is given, taking calculation of a weighted sum of interactions of the pulses at the (m+k)th moment, the (n+k)th moment and the (m+n+k)th moment, relative to the k(th) pulse sampling moment, as an example. Where, the number of the items for calculating a weighted sum of interactions of pulses of several items on three moments relative to the current moment is determined by a predefined (m, n) value.

It should be noted that m, n and k satisfy formula (m+k)+(n+k)−(m+n+k)=k. Where, m, n and k may be equal, i.e. the pulse sampling moments may be one or more moments relative to the current moment.

Furthermore, in a particular embodiment, mn≠0 denotes that either of m and n is not equal to 0. Thus, (m+k) and (n+k) may be equal, but not equal to (m+n+k), that is, the pulse sampling moments may be at least two moments relative to the current moment.

Therefore, the perturbation quantity acquiring unit 302 may be particularly used to calculate a weighted sum of interactions of pulses at three moments, such as the (m+k)th moment, the (n+k)th moment and the (m+n+k)th moment, relative to the current moment, such as the k(th) moment, so as to obtain perturbation quantity of the nonlinear effect of the current k(th) moment in passing a transmission link with a certain length.

In particular, for single polarization signals, the perturbation quantity acquiring unit 302 may first use the following formula to calculate a sum of weighted values of a plurality of items:

$$\Delta_k = \sum_{mn \neq 0} A_{m+k} A_{n+k} A^*_{m+n+k} C(m, n, z = L) \tag{7}$$

where, $\Delta_k$ denotes a sum of weighted values of several items at the k(th) moment, $C(m, n, z=L)$ denotes a weighted coefficient of each of the items, $A_{m+k}$ and $A_{n+k}$ denote respectively symbol information of the pulses at the (m+k)th moment and the (n+k)th moment, and $(A_{m+n+k}^V)^*$ denotes the conjugation of the symbol information of the pulse at the (m+n+k)th moment.

And for dual polarization signals, the perturbation quantity acquiring unit 302 may first use the following formula to calculate a sum of weighted values of a plurality of items:

$$\Delta_k^H = \left\{ \sum_{mn \neq 0} \begin{bmatrix} A_{m+k}^H A_{n+k}^H (A_{m+n+k}^H)^* + \\ A_{m+k}^H A_{n+k}^V (A_{m+n+k}^V)^* \end{bmatrix} C(m, n, z = L) + \sum_{m \neq 0} A_{m+k}^H A_k^V (A_{m+k}^V)^* C(m, 0, z = L) \right\} \tag{8}$$

$$\Delta_k^V = \left\{ \sum_{mn \neq 0} \begin{bmatrix} A_{m+k}^V A_{n+k}^V (A_{m+n+k}^V)^* + \\ A_{m+k}^V A_{n+k}^H (A_{m+n+k}^H)^* \end{bmatrix} C(m, n, z = L) + \sum_{m \neq 0} A_{m+k}^V A_k^H (A_{m+k}^H)^* C(m, 0, z = L) \right\}$$

where, $\Delta_k^H$ and $\Delta_k^V$ denote respectively a sum of weighted values of several items at the k(th) moment at the horizontal polarization state and the vertical polarization state, $C(m, n, z=L)$ denotes a weighted coefficient of each of the items, $A_{m+k}^H$ and $A_{m+k}^V$ denote respectively symbol information of the pulses at the (m+k)th moment at the horizontal polarization state and the vertical polarization state, $A_{n+k}^H$ and $A_{n+k}^V$ denote respectively symbol information of the pulses at the (n+k)th moment at the horizontal polarization state and the vertical polarization state, and $(A_{m+n+k}^H)^*$ and $(A_{n+k}^V)^*$ denote respectively the conjugation of the symbol information of the pulse at the (m+n+k)th moment at the horizontal polarization state and the vertical polarization state.

In this embodiment, is was found in simulation that when the additive perturbation is rotated by phase θ, the pre-compensated waveforms may further improve the performance of the system efficiently. Hence, for single polarization signals, the perturbation quantity acquiring unit 302 may use the following formula to phase rotate the perturbation quantity:

$$e^{j\theta}\Delta_k = e^{j\theta} \sum_{mn \neq 0} A_{m+k} A_{n+k} A^*_{m+n+k} C(m, n, z = L) \tag{9}$$

And for dual polarization signals, the perturbation quantity acquiring unit 302 may use the following formula to phase rotate the perturbation quantity:

$$e^{j\theta}\Delta_k^H = e^{j\theta} \left\{ \sum_{mn \neq 0} \begin{bmatrix} A_{m+k}^H A_{n+k}^H (A_{m+n+k}^H)^* + \\ A_{m+k}^H A_{n+k}^V (A_{m+n+k}^V)^* \end{bmatrix} C(m, n, z = L) + \sum_{m \neq 0} A_{m+k}^H A_k^V (A_{m+k}^V)^* C(m, 0, z = L) \right\} \tag{10}$$

$$e^{j\theta}\Delta_k^V = e^{j\theta} \left\{ \sum_{mn \neq 0} \begin{bmatrix} A_{m+k}^V A_{n+k}^V (A_{m+n+k}^H)^* + \\ A_{m+k}^V A_{n+k}^H (A_{m+n+k}^H)^* \end{bmatrix} C(m, n, z = L) + \sum_{m \neq 0} A_{m+k}^V A_k^H (A_{m+k}^H)^* C(m, 0, z = L) \right\}$$

Where, the phase θ in formula (9) and (10) does not vary along with the time, and is related to the link configuration of the system and the intensity of the nonlinearity. Likewise, a particular value of θ may be obtained in an existing optimization method, such as by monitoring the performance of the system (for example, a bit error rate) at the receiver side, etc.

In a practical optical fiber communication system, the input power often needs to be locked at P0. When the power of a pre-compensated signal is P0, the power occupied by the original signal part is less than P0, and in calculating perturbation items, it is assumed that the power of the original signal is P0. Hence, an amplitude coefficient ξ is needed to adjust the sizes of the perturbation items.

Furthermore, in this embodiment, the perturbation quantity processing unit 3023 may adjust the perturbation quantity by a predefined amplitude coefficient on the basis of phase rotation of the perturbation quantity.

In particular, for single polarization signals, the perturbation quantity acquiring unit 302 may use the following formula to adjust the perturbation quantity:

$$\xi e^{j\theta}\Delta_k = \xi e^{j\theta} \sum_{mn \neq 0} A_{m+k} A_{n+k} A^*_{m+n+k} C(m, n, z = L) \tag{11}$$

And for dual polarization signals, the perturbation quantity acquiring unit 302 may use the following formula to adjust the perturbation quantity:

$$\xi e^{j\theta}\Delta_k^H = \xi e^{j\theta}\left\{\sum_{mn\neq 0}\left[\begin{array}{c}A_{m+k}^H A_{n+k}^H (A_{m+n+k}^H)^* + \\ A_{m+k}^H A_{n+k}^V (A_{m+n+k}^V)^*\end{array}\right]C(m,n,z=L) + \sum_{m\neq 0}A_{m+k}^H A_k^V (A_{m+k}^V)^* C(m,0,z=L)\right\} \quad (11)$$

$$\xi e^{j\theta}\Delta_k^V = \xi e^{j\theta}\left\{\sum_{mn\neq 0}\left[\begin{array}{c}A_{m+k}^H A_{n+k}^H (A_{m+n+k}^H)^* + \\ A_{m+k}^H A_{n+k}^V (A_{m+n+k}^V)^*\end{array}\right]C(m,n,z=L) + \sum_{m\neq 0}A_{m+k}^V A_k^H (A_{m+k}^H)^* C(m,0,z=L)\right\}$$

where, ξ denotes the amplitude coefficient, and θ denotes the phase. Generally speaking, the amplitude coefficient ξ is a real number greater than 0 and less than 1, and the greater the nonlinearity of the system, the less the amplitude coefficient ξ. A particular value may be obtained in an existing optimization method, such as by monitoring the performance of the system, for example, a bit error rate, at the receiver side, etc.

In this embodiment, as both of the two parameters, the amplitude coefficient ξ and the phase θ, need to be obtained in advance by optimization, two-dimensional optimization is concerned in use. Where, two-dimensional joint optimization, and the prior art may be used in implementation, which shall not be described any further.

Furthermore, it was found in simulation that there exists no very intense coupling effect between the two coefficients ξ and θ, thus, they may be obtained by respectively scanning, so as to decrease the complexity. Therefore, the amplitude coefficient and the phase may be optimized by using two one-dimensional optimizations, that is, the most optimized value of the amplitude coefficient is determined first, and then the most optimized value of the phase is determined according to the most optimized value of the amplitude coefficient; or the most optimized value of the phase is determined first (which is determined given a non-zero amplitude coefficient), and then the most optimized value of the amplitude coefficient is determined according to the most optimized value of the phase.

In particular implementation, after θ and ξ are obtained, the effects of them may be absorbed by the coefficient C(m,n,z=L), thereby C'(m,n,z=L) is obtained as shown in formula (13):

$$C'(m,n,z=L)=\xi e^{j\theta}C(m,n,z=L) \quad (13)$$

In practical use, θ and ξ bring no extra complexity. In comparison with two-dimensional joint optimization, the complexity in calculation may be decreased to a great extent.

How the perturbation quantity acquiring unit 302 is realized is described above in detail. It should be noted that suitable variation or modification may be made by those skilled in the art according to the contents disclosed above. The formulas of the present invention are illustrative only, and the present invention is not limited thereto.

In this embodiment, the information compensating unit 303 may perform compensation according to the phase-rotated perturbation quantity obtained by the perturbation quantity acquiring unit 302. For example, for single polarization signals, the information compensating unit 303 may use the following formula:

$$B_k = A_k - \xi e^{j\theta}\Delta_k = A_k - \xi e^{j\theta}\sum_{mn\neq 0}A_{m+k}A_{n+k}A_{m+n+k}^*C(m,n,z=L) \quad (14)$$

And for dual polarization signals, the information compensating unit 303 may use the following formula:

$$B_k^H = A_k^H - \xi e^{j\theta}\Delta_k^H \quad (15)$$
$$= A_k^H - \xi e^{j\theta}\left\{\sum_{mn\neq 0}\left[\begin{array}{c}A_{m+k}^H A_{n+k}^H (A_{m+n+k}^H)^* + \\ A_{m+k}^H A_{n+k}^V (A_{m+n+k}^V)^*\end{array}\right]C(m,n,z=L) + \sum_{m\neq 0}A_{m+k}^H A_k^V (A_{m+k}^V)^* C(m,0,z=L)\right\}$$

$$B_k^V = V_k^H - \xi e^{j\theta}\Delta_k^V$$
$$= A_k^V - \xi e^{j\theta}\left\{\sum_{mn\neq 0}\left[\begin{array}{c}A_{m+k}^V A_{n+k}^V (A_{m+n+k}^H)^* + \\ A_{m+k}^V A_{n+k}^H (A_{m+n+k}^H)^*\end{array}\right]C(m,n,z=L) + \sum_{m\neq 0}A_{m+k}^V A_k^H (A_{m+k}^H)^* C(m,0,z=L)\right\}$$

where, $B_k^H$ and $B_k^V$ are pre-compensated symbol information at the k(th) moment at two polarization states, respectively, and $A_k^H$ and $A_k^V$ are original symbol information at the k(th) moment at two polarization states, respectively.

Formula (14) or (15) may be understood as that the pre-compensated symbol information sequence is equal to the original symbol information sequence subtracted by the vector additive perturbation item produced by the effect of the nonlinearity at a location spaced apart by L, the perturbation item consisting of a weighted sum of interactions of three pulses at different time points.

In this embodiment, C(m,n,z=L) is correspondingly a weighted coefficient of interactions of the m(th), n(th) and (m+n)th pulses relative to the current moment. It should be pointed out here that in a polarization multiplexing system, three pulses mutually interacted may be originated from the same polarization state, and may be originated from different polarization states. The weighted coefficient to which each of the items corresponds may be obtained in advance, for used by the perturbation quantity calculating unit 3022 in calculating weighted values.

As shown in FIG. 3, the nonlinear compensating apparatus may further include a coefficient acquiring unit 304. The coefficient acquiring unit 304 is used for acquiring the weighted coefficient to which each of the items corresponds by simulation, or acquiring the weighted coefficient to which each of the items corresponds by experiment, or acquiring the weighted coefficient to which each of the items corresponds according to the configuration of the transmission link and the positions of pulses interacted on one or more moments relative to the position of the pulses on the current moment.

Where, when the weighted coefficient is obtained on the basis of simulation and experiment, different transmission signals may be designed in the simulation or experiment, and the value of the weighted coefficient is derived inversely according to the received signals. And the accuracy of such a method is high.

Where, when the weighted coefficient of each of the items is obtained by the coefficient acquiring unit 304 according to the configuration of the transmission link and the positions of pulses interacted on one or more moments relative to the position of the pulses on the current moment, the coefficient acquiring unit 304 may use the following formula to calculate the weighted coefficient:

$$C(m, n, z = L) = j \int_0^L \frac{\gamma(z)p(z)}{\sqrt{1 + 2js(z)/\tau^2 + 3(s(z)/\tau^2)^2}} \exp \quad (16)$$

$$\left\{ -\frac{3mnT^2}{\tau^2(1 + 3js(z)/\tau^2)} - \frac{(m-n)^2 T^2}{\tau^2[1 + 2js(z)/\tau^2 + 3(s(z)/\tau^2)^2]} \right\} dz$$

Where, if the current moment is the k(th) moment, the three moments relative to the current moment are the (m+k)th moment, the (n+k)th moment and the (m+n+k)th moment; and each of several (m, n) values corresponds to different weighted coefficients C(m,n,z=L). Where, the values of m and n may be any values in the range from minus infinity to plus infinity, and are related to all the values before and after the k(th) moment.

Furthermore, it is usually that as the absolute values of (m, n) values increase, the absolute values of C(m, n, z=L) values decrease. Hence, a certain number of (m, n) values may be taken for calculating perturbation quantity according to a required accuracy of calculation.

Thus, the values of m and n may be taken in the following manner: in taking m and n, when the modulus |C(m,n,z=L)| of the weighted coefficient C(m,n,z=L) obtained according to m and n is greater than or equal to a predefined value, m and n are taken; otherwise, m and n are not taken. The predefined value may be set according to a certain proportional coefficient of the maximum modulus of all the coefficients. For example, normalized coefficients C may be taken from all the combinations of m and n satisfying |C(m,n,z=L)>1e−3*max(|C(m,n,z=L)|).

Where, p(z) denotes the power of the signal on the transmission link spaced apart from the transmitting side by z, s(z) denotes the accumulated net dispersion value on the transmission link spaced apart from the transmitting side by z, τ denotes a half value width of the pulse, T denotes a pulse interval, and γ(z) denotes the nonlinear coefficient on the transmission link spaced apart from the transmitting side by z;

or, when the transmission link does not contain a dispersion compensating module, the attenuation in the transmission of the signals is neglected, and the dispersion coefficient and the nonlinear coefficient do not vary along with the distance of transmission, the coefficient acquiring unit 404 may further use the following formula to calculate the weighted coefficient:

$$C(m, n, z = L) = j \frac{\gamma p_0 \tau^2}{\sqrt{3}|\beta_2|} \text{expint}\left(-j\frac{mnT^2}{\beta_2 L}\right) \quad (17)$$

where, γ denotes the nonlinear coefficient, $p_0$ denotes the power of the signal at the transmitting side, $\beta_2$ denotes the dispersion coefficient, and exp int denotes an exponential integral function, the integral function being capable of expressed as $$\text{expint}(z) = \int_z^\infty \frac{e^{-x}}{x} dx.$$

The nonlinear compensating apparatus may further include a storing unit for storing the obtained weighted coefficients for use in calculating the weighted values; furthermore, the storing unit may also store channel coefficients for calculating the weighted coefficients, such as the nonlinear coefficient γ, the dispersion coefficient $\beta_2$, and the length L of the transmission link, etc.

The nonlinear compensating apparatus of the present invention is described in detail above. The performances after different nonlinear compensation are compared taking a DP-QPSK system with no dispersion compensation as an example. Where, coefficients of the system are shown in Table 1:

TABLE 1

| Coefficients of the system | | | |
|---|---|---|---|
| Baud rate | 28 GB | Pulse shape | RZ/NRZ |
| Link | 60 km × 25 | Optical signal to noise ratio | 13.5 dB |
| Optical dispersion coefficient | 17 ps/nm/km | Attenuation coefficient of optical fiber | 0.2 dB/km |
| Nonlinear coefficient of the optical fiber | 1.3/W/km | Length of sequence | 4096 |

Figure 4:
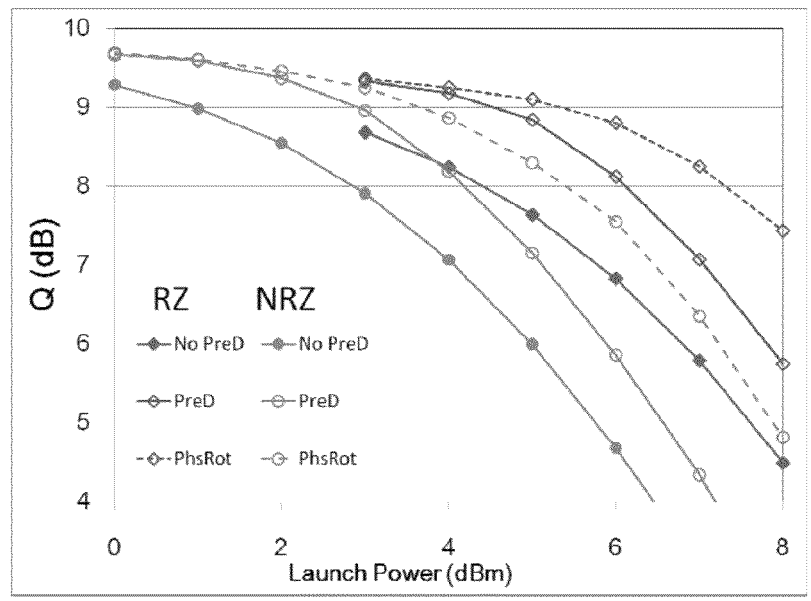
FIG. 4 is a comparison graph of a DP-QPSK system with no dispersion compensation after different nonlinear compensation of the embodiments of the present invention.

FIG. 4 gives a comparison graph of a DP-QPSK system with no dispersion compensation after different nonlinear compensation, in which cases where the performances are improved at different input power when there is not pre-compensation, phase rotated pre-compensation is not performed and phase rotated pre-compensation is performed are included. As shown in FIG. 4, when phase rotation is introduced, the pre-compensated performances in RZ and NRZ formats are improved to a relatively great extent. Hence, phase rotation is very efficient and necessary to a pre-compensating system.

Figure 5:
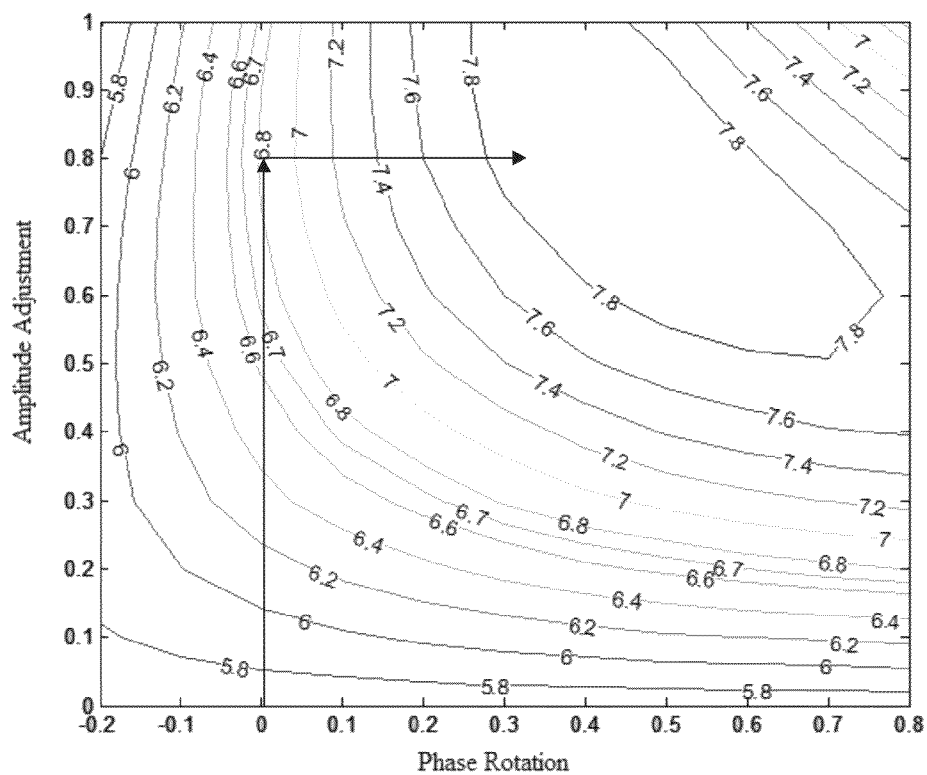
FIG. 5 is a schematic diagram of a single polarization NRZ-QPSK pre-compensating system varying along with an amplitude coefficient and a rotation phase of the embodiments of the present invention.

FIG. 5 describes a tendency of variation of a single polarization NRZ-QPSK pre-compensating system (the link is as shown in Table 1) along with an amplitude coefficient ξ and a rotation phase θ. The input optical power is lock at 3 dBm. The two arrows in FIG. 5 show paths for optimizing the two parameters ξ and θ. It can be seen that when a manner of one-dimension optimization is used, the performance that can be reached by the system is extremely close a two-dimensional optimal value.

It can be seen from the above embodiment that the nonlinear compensating apparatus may compensate for the symbol information of the pulse signals inputted by a transmitting side, and if the apparatus is applied in a transmitter, the transmitter can shape and modulate the pulses by using the compensated symbol information, and then transmit the signals; and after these signals are subjected to the nonlinear effect of optical fiber transmission link, ideal undamaged signals are obtained at the receiver.

And the nonlinear compensating apparatus may further improve the performance by calculating a weighted sum of interactions of the pulses on one or more moments and compensating for the original information sequence after phase rotating the perturbation quantity; and the calculation method is simple, applicable to single polarization and polarization multiplexing systems, and at the same time, compatible with any modulation formats.

Figure 6:
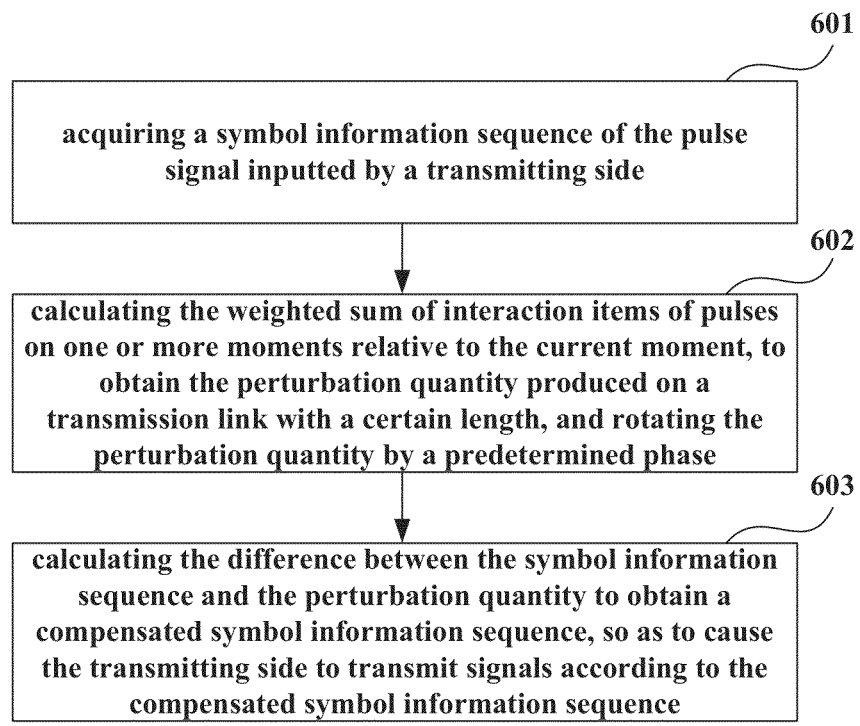
FIG. 6 is a flowchart of the nonlinear compensating method of the embodiments of the present invention.

The embodiments of the present invention further provide a nonlinear compensating method. FIG. 6 is a flowchart of the nonlinear compensating method of the embodiments of the present invention. And the parts identical to those in the above embodiments shall not be described any further.

As shown in FIG. 6, the nonlinear compensating method includes:

step 601: acquiring a symbol information sequence of the pulse signal inputted by a transmitting side;

step 602: calculating the weighted sum of interaction items of pulses on one or more moments relative to the current moment, to obtain the perturbation quantity produced on a transmission link with a certain length, and rotating the perturbation quantity by a predetermined phase; and step 603: calculating the difference between the symbol information sequence and the perturbation quantity to obtain a compensated symbol information sequence, so as to cause the transmitting side to transmit signals according to the compensated symbol information sequence.

Figure 7:
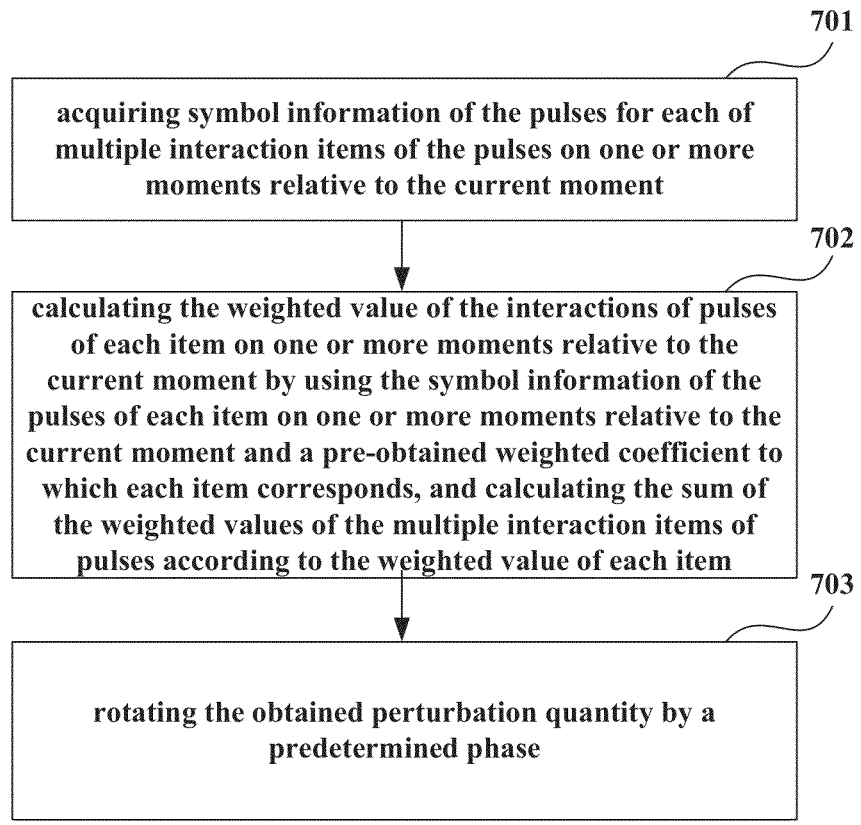
FIG. 7 is a flowchart of the perturbation quantity acquiring step of the embodiments of the present invention.

FIG. 7 is a flowchart of the perturbation quantity acquiring step of the embodiments of the present invention. As shown in FIG. 7, step 602 may particularly includes:

step 701: acquiring symbol information of the pulses for each of multiple interaction items of the pulses on one or more moments relative to the current moment;

step 702: calculating the weighted value of the interactions of pulses of each item on one or more moments relative to the current moment by using the symbol information of the pulses of each item on one or more moments relative to the current moment and a pre-obtained weighted coefficient to which each item corresponds, and calculating the sum of the weighted values of the multiple interaction items of pulses according to the weighted value of each item, so as to obtain the perturbation quantity produced on a transmission link with a certain length; and step 703: rotating the obtained perturbation quantity by a predetermined phase.

Furthermore, after calculating the sum of the weighted values of a plurality of items, the perturbation item containing the symbol information of the current moment may be discarded in step 702.

Furthermore, the perturbation quantity may be adjusted in step 703 by a predefined amplitude coefficient.

In particular implementation, two-dimensional joint optimization may be performed to the amplitude coefficient and the phase; or two one-dimensional optimizations may be performed to the amplitude coefficient and the phase, that is, the most optimized value of the amplitude coefficient is determined first, and then the most optimized value of the phase is determined according to the most optimized value of the amplitude coefficient; or the most optimized value of the phase is determined first, and then the most optimized value of the amplitude coefficient is determined according to the most optimized value of the phase.

In an embodiment, the inputted pulse signals may be single polarization signals, and the following formula may be used in step 602:

$$\xi e^{j\theta}\Delta_k = \xi e^{j\theta} \sum_{mn\neq 0} A_{m+k} A_{n+k} A^*_{m+n+k} C(m, n, z = L)$$

where, $\Delta_k$ denotes a sum of weighted values of several items at the k(th) moment, $\xi$ denotes the amplitude coefficient, $\theta$ denotes the phase, $C(m, n, z=L)$ denotes a weighted coefficient of each of the items, $A_{m+k}$ and $A_{n+k}$ denote respectively symbol information of the pulses at the (m+k)th moment and the (n+k)th moment, and $(A_{m+n+k}^V)^*$ denotes the conjugation of the symbol information of the pulse at the (m+n+k)th moment.

In another embodiment, the inputted pulse signals may be dual polarization signals, and the following formula may be used in step 602:

$$\xi e^{j\theta}\Delta_k^H = \xi e^{j\theta} \left\{ \sum_{mn\neq 0} \begin{bmatrix} A_{m+k}^H A_{n+k}^H (A_{m+n+k}^H)^* + \\ A_{m+k}^H A_{n+k}^V (A_{m+n+k}^V)^* \end{bmatrix} C(m, n, z = L) + \sum_{m\neq 0} A_{m+k}^H A_k^V (A_{m+k}^V)^* C(m, 0, z = L) \right\}$$

$$\xi e^{j\theta}\Delta_k^V = \xi e^{j\theta} \left\{ \sum_{mn\neq 0} \begin{bmatrix} A_{m+k}^V A_{n+k}^V (A_{m+n+k}^H)^* + \\ A_{m+k}^V A_{n+k}^H (A_{m+n+k}^H)^* \end{bmatrix} C(m, n, z = L) + \sum_{m\neq 0} A_{m+k}^V A_k^H (A_{m+k}^H)^* C(m, 0, z = L) \right\}$$

where, $\Delta_k^H$ and $\Delta_k^V$ denote respectively a sum of weighted values of several items at the k(th) moment at the horizontal polarization state and the vertical polarization state, $\xi$ denotes the amplitude coefficient, $\theta$ denotes the phase, $C(m,n,z=L)$ denotes a weighted coefficient of each of the items, $A_{m+k}^H$ and $A_{m+k}^V$ denote respectively symbol information of the pulses at the (m+k)th moment at the horizontal polarization state and the vertical polarization state, $A_{n+k}^H$ and $A_{n+k}^V$ denote respectively symbol information of the pulses at the (n+k)th moment at the horizontal polarization state and the vertical polarization state, and $(A_{m+n+k}^H)^*$ and $(A_{m+n+k}^V)^*$ denote respectively the conjugation of the symbol information of the pulse at the (m+n+k)th moment at the horizontal polarization state and the vertical polarization state.

It can be seen from the above embodiment that the nonlinear compensating method may compensate for the symbol information of the pulse signals inputted by a transmitting side, and if the method is applied to a transmitter, the transmitter can shape and modulate the pulses by using the compensated symbol information, and then transmit the signals; and after these signals are subjected to the nonlinear effect of optical fiber transmission link, ideal undamaged signals are obtained at the receiver.

And the nonlinear compensating method may further improve the performance by calculating a weighted sum of interactions of the pulses on one or more moments and compensating for the original information sequence after phase rotating the perturbation quantity; and the calculation method is simple, applicable to single polarization and polarization multiplexing systems, and at the same time, compatible with any modulation formats.

Figure 8:
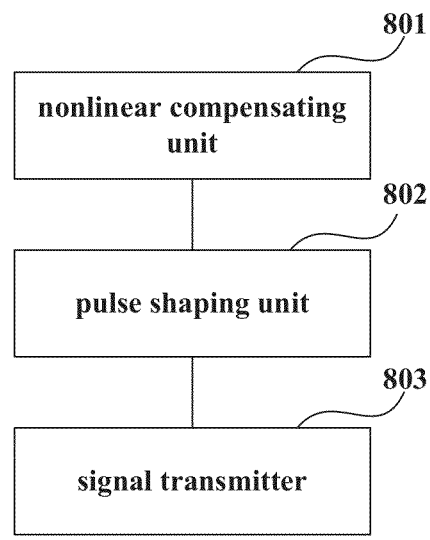
FIG. 8 is a schematic diagram of the construction of the transmitter of the embodiments of the present invention.

The embodiments of the present invention further provide a transmitter. FIG. 8 is a schematic diagram of the construction of the transmitter of the embodiments of the present invention. As shown in FIG. 8, the transmitter includes: a nonlinear compensating unit 801, a pulse shaping unit 802 and a signal transmitter 803.

Where, the nonlinear compensating unit 801 may compensate for a symbol information sequence of an inputted pulse, and may use the nonlinear compensating apparatus of the above embodiments, which shall not be described any further. The pulse shaping unit 802 is used for performing pulses shaping based on the compensated symbol information sequence obtained by the nonlinear compensating unit 801, to obtain the waveform of each pulse.

And the signal transmitter 803 is used for receiving the waveform of each pulse transmitted by the pulse shaping unit 802, then modulating and transmitting the waveforms.

In this embodiment, the nonlinear compensating apparatus is applied in the transmitter. The transmitter may be applied in any optical communication systems in which a system with electric field dispersion pre-compensation is included. Therefore, the transmitter may further include a dispersion compensating unit (not shown), and in the system including dispersion pre-compensation, an intra-channel nonlinearity pre-compensator may be placed before the dispersion compensating unit. The weighted coefficients to which the weighted values of the interactions of the pulses at different moments correspond may still be calculated according to the above embodiments, only if a dispersion compensating module is taken into consideration in the configuration of the dispersion.

It can be seen from the above embodiment that the transmitter can shape and modulate the pulses by using the compensated symbol information, and then transmit the signals; and after these signals are subjected to the nonlinear effect of optical fiber transmission link, ideal undamaged signals are obtained at the receiver.

And the transmitter may further improve the performance by calculating a weighted sum of interactions of the pulses on one or more moments and compensating for the original information sequence after phase rotating the perturbation quantity; and the calculation method is simple, applicable to single polarization and polarization multiplexing systems, and at the same time, compatible with any modulation formats.

The above apparatus and method of the present invention may be implemented by hardware, or may be implemented by hardware in combination with software. The present invention relates to such a computer-readable program that when it is executed by a logic component, it enables the logic component to implement the above apparatus or its compositions, or enables the logic component to implement all the method or steps described above. The present further relates to a storage medium in which the above program is stored, such as a hard disk, a floppy disk, a compacted disk, a DVD, or a flash memory, etc.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

For the implementation of the present invention containing the above embodiments, following supplements are further disclosed.

(Supplement 1). A nonlinear compensating apparatus, comprising:

an information sequence acquiring unit, configured to acquire a symbol information sequence of the pulse signal inputted by a transmitting side;

a perturbation quantity acquiring unit, configured to calculate the weighted sum of interaction items of pulses on one or more moments relative to the current moment, to obtain the perturbation quantity produced on a transmission link with a certain length, and rotating the obtained perturbation quantity by a predetermined phase; and an information compensating unit, configured to calculate the difference between the symbol information sequence and the perturbation quantity to obtain a compensated symbol information sequence, so as to cause the transmitting side to transmit signals according to the compensated symbol information sequence.

(Supplement 2). The nonlinear compensating apparatus according to supplement 1, wherein the perturbation quantity acquiring unit is used for calculating a weighted sum of the interactions of pulses on at least two moments relative to the current moment.

(Supplement 3). The nonlinear compensating apparatus according to supplement 1, wherein the perturbation quantity acquiring unit comprises:

a symbol information acquiring unit, configured to acquire symbol information of the pulses for each of multiple interaction items of the pulses on one or more moments relative to the current moment;

a perturbation quantity calculating unit, configured to calculate the weighted value of the interactions of pulses of each item on one or more moments relative to the current moment by using the symbol information of the pulses of each item on one or more moments relative to the current moment and a pre-obtained weighted coefficient to which each item corresponds, and calculating the sum of the weighted values of the multiple interaction items of pulses according to the weighted value of each item, so as to obtain the perturbation quantity produced on a transmission link with a certain length; and a perturbation quantity processing unit, configured to rotate the obtained perturbation quantity by a predetermined phase.

(Supplement 4). The nonlinear compensating apparatus according to supplement 3, wherein the perturbation quantity calculating unit discards perturbation quantities including the symbol information of the current moment after calculating the sum of the weighted values of the interaction items of a plurality of pulses.

(Supplement 5). The nonlinear compensating apparatus according to supplement 3 or 4, wherein the perturbation quantity processing unit further adjusts the perturbation quantity by a predetermined amplitude coefficient.

(Supplement 6). The nonlinear compensating apparatus according to supplement 5, wherein two-dimensional joint optimization is performed to the amplitude coefficient and the phase.

(Supplement 7). The nonlinear compensating apparatus according to supplement 5, wherein the amplitude coefficient and the phase are optimized by using two one-dimension optimizations, that is, the most optimized value of the amplitude coefficient is determined first, and then the most optimized value of the phase is determined according to the most optimized value of the amplitude coefficient; or the most optimized value of the phase is determined first, and then the most optimized value of the amplitude coefficient is determined according to the most optimized value of the phase.

(Supplement 8). The nonlinear compensating apparatus according to supplement 5, wherein the inputted pulse signals are single polarization signals, and the information compensating unit uses the following formula:

$$B_k = A_k - \xi e^{j\theta} \Delta_k = A_k - \xi e^{j\theta} \sum_{mn \neq 0} A_{m+k} A_{n+k} A^*_{m+n+k} C(m, n, z = L)$$

where, $\Delta_k$ denotes a sum of weighted values of several items at the k(th) moment, $\xi$ denotes the amplitude coefficient, $\theta$ denotes the phase, $C(m, n, z=L)$ denotes a weighted coefficient of each of the items, $A_{m+k}$ and $A_{n+k}$ denote respectively symbol information of the pulses at the (m+k)th moment and the (n+k)th moment, and $(A_{+n+k}^V)^*$ denotes the conjugation of the symbol information of the pulse at the (m+n+k)th moment.

(Supplement 9). The nonlinear compensating apparatus according to supplement 5, wherein the inputted pulse signals are dual polarization signals, and the information compensating unit uses the following formula:

$$B_k^H = A_k^H - \xi e^{j\theta} \Delta_k^H$$

$$= A_k^H - \xi e^{j\theta} \left\{ \sum_{mn \neq 0} \begin{bmatrix} A_{m+k}^H A_{n+k}^H (A_{m+n+k}^H)^* + \\ A_{m+k}^H A_{n+k}^V (A_{m+n+k}^V)^* \end{bmatrix} C(m, n, z = L) + \sum_{m \neq 0} A_{m+k}^H A_k^V (A_{m+k}^V)^* C(m, 0, z = L) \right\}$$

$$B_k^V = B_k^H - \xi e^{j\theta} \Delta_k^V$$

$$= A_k^V - \xi e^{j\theta} \left\{ \sum_{mn \neq 0} \begin{bmatrix} A_{m+k}^V A_{n+k}^V (A_{m+n+k}^V)^* + \\ A_{m+k}^V A_{n+k}^H (A_{m+n+k}^H)^* \end{bmatrix} C(m, n, z = L) + \sum_{m \neq 0} A_{m+k}^V A_k^H (A_{m+k}^H)^* C(m, 0, z = L) \right\}$$

where, $\Delta_k^H$ and $\Delta_k^V$ denote respectively a sum of weighted values of several items at the k(th) moment at the horizontal polarization state and the vertical polarization state, $\xi$ denotes the amplitude coefficient, $\theta$ denotes the phase, $C(m,n,z=L)$ denotes a weighted coefficient of each of the items, $A_{m+k}^H$ and $A_{n+k}^V$ denote respectively symbol information of the pulses at the (m+k)th moment at the horizontal polarization state and the vertical polarization state, $A_{n+k}^H$ and $A_{n+k}^V$ denote respectively symbol information of the pulses at the (n+k)th moment at the horizontal polarization state and the vertical polarization state, and $(A_{m+n+k}^H)^*$ and $(A_{m+n+k}^V)^*$ denote respectively the conjugation of the symbol information of the pulse) at the (m+n+k)th moment at the horizontal polarization state and the vertical polarization state.

(Supplement 10). The nonlinear compensating apparatus according to supplement 3, wherein the nonlinear compensating apparatus further comprises:

a coefficient acquiring unit, configured to acquire the weighted coefficient by simulation, or acquiring the weighted coefficient by experiment, or acquiring the weighted coefficient according to the configuration of the transmission link and the positions of pulses interacted on one or more moments relative to the position of the pulses on the current moment.

(Supplement 11). A nonlinear compensating method, comprising:

an information sequence acquiring step, for acquiring a symbol information sequence of the pulse signal inputted by a transmitting side;

a perturbation quantity acquiring step, for calculating the weighted sum of interaction items of pulses on one or more moments relative to the current moment, to obtain the perturbation quantity produced on a transmission link with a certain length, and rotating the perturbation quantity by a predetermined phase; and an information compensating step, for calculating the difference between the symbol information sequence and the perturbation quantity to obtain a compensated symbol information sequence, so as to cause the transmitting side to transmit signals according to the compensated symbol information sequence.

(Supplement 12). The nonlinear compensating method according to supplement 11, wherein the perturbation quantity acquiring step is used for calculating a weighted sum of the interactions of pulses on at least two moments relative to the current moment.

(Supplement 13). The nonlinear compensating method according to supplement 11, wherein the perturbation quantity acquiring step comprises:

a symbol information acquiring step, for acquiring symbol information of the pulses for each of multiple interaction items of the pulses on one or more moments relative to the current moment;

a perturbation quantity calculating step, for calculating the weighted value of the interactions of pulses of each item on one or more moments relative to the current moment by using the symbol information of the pulses of each item on one or more moments relative to the current moment and a pre-obtained weighted coefficient to which each item corresponds, and calculating the sum of the weighted values of the multiple interaction items of pulses according to the weighted value of each item, so as to obtain the perturbation quantity produced on a transmission link with a certain length; and a perturbation quantity processing step, for rotating the obtained perturbation quantity by a predetermined phase.

(Supplement 14). The nonlinear compensating method according to supplement 13, wherein the perturbation quantity calculating step discards perturbation quantities including the symbol information of the current moment after calculating the sum of the weighted values of the interaction items of a plurality of pulses.

(Supplement 15). The nonlinear compensating method according to supplement 13 or 14, wherein the perturbation quantity processing step further adjusts the perturbation quantity by a predetermined amplitude coefficient.

(Supplement 16). The nonlinear compensating method according to supplement 15, wherein two-dimensional joint optimization is performed to the amplitude coefficient and the phase.

(Supplement 17). The nonlinear compensating method according to supplement 15, wherein the amplitude coefficient and the phase are optimized by using two one-dimension optimizations, that is, the most optimized value of the amplitude coefficient is determined first, and then the most optimized value of the phase is determined according to the most optimized value of the amplitude coefficient; or the most optimized value of the phase is determined first, and then the most optimized value of the amplitude coefficient is determined according to the most optimized value of the phase.

(Supplement 18). The nonlinear compensating method according to supplement 15, wherein the inputted pulse signals are single polarization signals, and the information compensating unit uses the following formula:

$$B_k = A_k - \xi e^{j\theta} \Delta_k = A_k - \xi e^{j\theta} \sum_{mn \neq 0} A_{m+k} A_{n+k} A_{m+n+k}^* C(m, n, z = L)$$

where, $\Delta_k$ denotes a sum of weighted values of several items at the k(th) moment, denotes the amplitude coefficient, $\theta$ denotes the phase, $C(m,n,z=L)$ denotes a weighted coefficient of each of the items, $A_{m+k}$ and $A_{n+k}$ denote respectively symbol information of the pulses at the (m+k)th moment and the (n+k)th moment, and $(A_{m+n+k}^V)^*$ denotes the conjugation of the symbol information of the pulse at the (m+n+k)th moment.

(Supplement 19). The nonlinear compensating method according to supplement 15, wherein the inputted pulse signals are dual polarization signals, and the information compensating unit uses the following formula:

$$B_k^H = A_k^H - \xi e^{j\theta}\Delta_k^H$$

$$= A_k^H - \xi e^{j\theta}\left\{\sum_{mn\neq 0}\begin{bmatrix}A_{m+k}^H A_{n+k}^H (A_{m+n+k}^H)^* + \\ A_{m+k}^H A_{n+k}^V (A_{m+n+k}^V)^*\end{bmatrix}C(m,n,z=L) + \sum_{m\neq 0}A_{m+k}^H A_k^V (A_{m+k}^V)^* C(m,0,z=L)\right\}$$

$$B_k^V = B_k^H - \xi e^{j\theta}\Delta_k^V$$

$$= A_k^V - \xi e^{j\theta}\left\{\sum_{mn\neq 0}\begin{bmatrix}A_{m+k}^V A_{n+k}^V (A_{m+n+k}^V)^* + \\ A_{m+k}^V A_{n+k}^H (A_{m+n+k}^H)^*\end{bmatrix}C(m,n,z=L) + \sum_{m\neq 0}A_{m+k}^V A_k^H (A_{m+k}^H)^* C(m,0,z=L)\right\}$$

where, $\Delta_k^H$ and $\Delta_k^V$ denote respectively a sum of weighted values of several items at the k(th) moment at the horizontal polarization state and the vertical polarization state, $\xi$ denotes the amplitude coefficient, $\theta$ denotes the phase, C(m,n,z=L) denotes a weighted coefficient of each of the items, $A_{m+k}^H$ and $A_{m+k}^V$ denote respectively symbol information of the pulses at the (m+k)th moment at the horizontal polarization state and the vertical polarization state, $A_{n+k}^H$ and $A_{n+k}^V$ denote respectively symbol information of the pulses at the (n+k)th moment at the horizontal polarization state and the vertical polarization state, and $(A_{m+n+k}^H)^*$ and $(A_{m+n+k}^V)^*$ denote respectively the conjugation of the symbol information of the pulse at the (m+n+k)th moment at the horizontal polarization state and the vertical polarization state.

(Supplement 20). A transmitter, comprising the nonlinear compensating apparatus as stated in any one of supplements 1-10, and the transmitter further comprising:

a pulse shaping unit, configured to perform pulses shaping based on the compensated symbol information sequence obtained by the nonlinear compensating apparatus, to obtain the waveform of each pulse; and a signal transmitter, configured to receive the waveform of each pulse transmitted by the pulse shaping unit, then modulating and transmitting the waveforms.

The invention claimed is:

1. A nonlinear compensating apparatus, comprising:
an information sequence acquiring unit, configured to acquire a symbol information sequence of a pulse signal inputted by a transmitting side, wherein the inputted pulse signal is a single-polarization signal;
a perturbation quantity acquiring unit, configured to calculate a weighted sum of interaction items of pulses on one or more moments relative to a current moment to obtain the perturbation quantity produced on a transmission link with a certain length, and rotate the obtained perturbation quantity by a predetermined phase; and
an information compensating unit, configured to calculate a difference between the symbol information sequence and the perturbation quantity to obtain a compensated symbol information sequence to cause the transmitting side to transmit signals according to the compensated symbol information sequence, wherein the information compensating unit uses the following formula:

$$B_k = A_k - \xi e^{j\theta}\Delta_k = A_k - \xi e^{j\theta}\sum_{mn\neq 0} A_{m+k}A_{n+k}A_{m-n+k}^* C(m,n,z=L)$$

where, $\Delta_k$ denotes the weighted sum of the interaction items of pulses on kth moment, $\xi$ denotes an amplitude coefficient, $\theta$ denotes the phase, C(m, n, z=L) denotes a weighted coefficient of each item $A_{m+k}$ and $A_{n+k}$ denote respectively the symbol information of the pulses of (m+k)th and (n+k)th moments, and $(A^{m+n+k})^*$ denotes a conjugation of the symbol information of the pulses on (m+n+k)th moment.

2. The nonlinear compensating apparatus according to claim 1, wherein the perturbation quantity acquiring unit comprises:
a symbol information acquiring unit, configured to acquire symbol information of the pulses for each of multiple interaction items of the pulses on one or more moments relative to the current moment;
a perturbation quantity calculating unit, configured to calculate a weighted value of the interactions of pulses of each item on one or more moments relative to the current moment by using the symbol information of the pulses of each item on one or more moments relative to the current moment and a pre-obtained weighted coefficient to which each item corresponds, and calculate a sum of the weighted values of the multiple interaction items of pulses according to the weighted value of each item to obtain the perturbation quantity produced on the transmission link with the certain length; and
a perturbation quantity processing unit, configured to rotate the obtained perturbation quantity by the predetermined phase.

3. The nonlinear compensating apparatus according to claim 2, wherein the nonlinear compensating apparatus further comprises:
a coefficient acquiring unit, configured to acquire the weighted coefficient by simulation, or acquire the weighted coefficient by experiment, or acquire the weighted coefficient according to a configuration of the transmission link and positions of the pulses interacted on one or more moments relative to a position of the pulses on the current moment.

4. The nonlinear compensating apparatus according to claim 3, wherein the perturbation quantity processing unit further adjusts the perturbation quantity by a predetermined amplitude coefficient.

5. The nonlinear compensating apparatus according to claim 4, wherein a two-dimensional joint optimization is performed to the amplitude coefficient and the phase; or two one-dimensional optimizations are performed to the amplitude coefficient and the phase, that is, determine an optimal value of the amplitude coefficient first, and then determine an optimal value of the phase according to optimal value of the amplitude coefficient; or determine an optimal value of the phase first, and then determine an optimal value of the amplitude coefficient according to optimal value of the phase.

6. The nonlinear compensating apparatus according to claim 4, wherein the inputted pulse signal is a dual-polarization signal; and the information compensating unit uses the following formula:

$$B_k^H = A_k^H - \xi e^{j\theta}\Delta_k^H$$
$$= A_k^H - \xi e^{j\theta}\left\{\sum_{mn\neq 0}\left[\begin{array}{c}A_{m+k}^H A_{n+k}^H (A_{m+n+k}^H)^* + \\ A_{m+k}^H A_{n+k}^V (A_{m+n+k}^V)^*\end{array}\right]C(m,n,z=L) + \sum_{m\neq 0}A_{m+k}^H A_k^V (A_{m+k}^V)^* C(m,0,z=L)\right\}$$

$$B_k^V = B_k^H - \xi e^{j\theta}\Delta_k^V$$
$$= A_k^V - \xi e^{j\theta}\left\{\sum_{mn\neq 0}\left[\begin{array}{c}A_{m+k}^V A_{n+k}^V (A_{m+n+k}^V)^* + \\ A_{m+k}^V A_{n+k}^H (A_{m+n+k}^H)^*\end{array}\right]C(m,n,z=L) + \sum_{m\neq 0}A_{m+k}^V A_k^H (A_{m+k}^H)^* C(m,0,z=L)\right\}$$

where, $\Delta_k^H$ and $\Delta_k^V$ denote respectively the sum of the weighted values of the multiple interaction items of pulses on the kth moment at a horizontal polarization state and a vertical polarization state, $\xi$ denotes the amplitude coefficient, $\theta$ denotes the phase, $C(m,n,z=L)$ denotes the weighted coefficient of each item, $A_{m+k}^H$ and $A_{m+k}^V$ denote respectively the symbol information of the pulses on the (m+k)th moment at the horizontal polarization state and the vertical polarization state, $A_{n+k}^H$ and $A_{n+k}^V$ denote respectively the symbol information of the pulses on the (n+k)th moment at the horizontal polarization state and the vertical polarization state, and $(A_{m+n+k}^H)^*$ and $(A_{m+n+k}^V)^*$ denote respectively the conjugation of the symbol information of the pulses on the (m+n+k)th moment at the horizontal polarization state and the vertical polarization state.

7. A nonlinear compensating method, comprising:
an information sequence acquiring step, for acquiring a symbol information sequence of the pulse signal inputted by a transmitting side, wherein the inputted pulse signal is a single-polarization signal;
a perturbation quantity acquiring step, for calculating a weighted sum of interaction items of pulses on one or more moments relative to a current moment to obtain the perturbation quantity produced on a transmission link with a certain length, and rotating the perturbation quantity by a predetermined phase; and
an information compensating step, for calculating a difference between the symbol information sequence and the perturbation quantity to obtain a compensated symbol information sequence to cause the transmitting side to transmit signals according to the compensated symbol information sequence, wherein each of the steps is implemented by using a hardware, and wherein the information compensating step uses the following formula:

$$B_k = A_k - \xi e^{j\theta}\Delta_k = A_k - \xi e^{j\theta}\sum_{mn\neq 0}A_{m+k}A_{n+k}A_{m-n+k}^* C(m,n,z=L)$$

where $\Delta_k$ denotes the weighted sum of the interaction items of pulses on kth moment, $\xi$ denotes an amplitude coefficient, $\theta$ e denotes the phase, $C(m,n,z=L)$ denotes a weighted coefficient of each item $A_{m+k}$ and $A_{n+k}$ denote respectively the symbol information of the pulses of (m+k)th and (n+k)th moments, and $(A^{m+n+k})^*$ denotes a conjugation of the symbol information of the pulses on (m+n+k)th moment.

8. The nonlinear compensating method according to claim 7, wherein the perturbation quantity acquiring step comprises:
a symbol information acquiring step, for acquiring symbol information of the pulses for each of multiple interaction items of the pulses on one or more moments relative to the current moment;
a perturbation quantity calculating step, for calculating a weighted value of the interactions of pulses of each item on one or more moments relative to the current moment by using the symbol information of the pulses of each item on one or more moments relative to the current moment and a pre-obtained weighted coefficient to which each item corresponds, and calculating a sum of the weighted values of the multiple interaction items of pulses according to the weighted value of each item to obtain the perturbation quantity produced on the transmission link with the certain length; and
a perturbation quantity processing step, for rotating the obtained perturbation quantity by the predetermined phase.

9. A transmitter, comprising:
an information sequence acquiring unit, configured to acquire a symbol information sequence of a pulse signal inputted by a transmitting side, wherein the inputted pulse signal is a single-polarization signal;
a perturbation quantity acquiring unit, configured to calculate a weighted sum of interaction items of pulses on one or more moments relative to a current moment to obtain the perturbation quantity produced on a transmission link with a certain length, and rotate the obtained perturbation quantity by a predetermined phase; and
an information compensating unit, configured to calculate a difference between the symbol information sequence and the perturbation quantity to obtain a compensated symbol information sequence to cause the transmitting side to transmit signals according to the compensated symbol information sequence, wherein the information compensating unit uses the following formula:

$$B_k = A_k - \xi e^{j\theta}\Delta_k = A_k - \xi e^{j\theta}\sum_{mn\neq 0}A_{m+k}A_{n+k}A_{m-n+k}^* C(m,n,z=L)$$

where, $\Delta_k$ denotes the weighted sum of the interaction items of pulses on kth moment, $\xi$ denotes an amplitude coefficient, $\theta$ denotes the phase, $C(m,n,z=L)$ denotes a weighted coefficient of each item $A_{m+k}$ and $A_{n+k}$ denote respectively the symbol information of the pulses of (m+k)th and (n+k)th moments, and $(A^{m+n+5})^*$ denotes a conjugation of the symbol information of the pulses on (m+n+k)th moment; and
the transmitter further comprising:
a pulse shaping unit, configured to perform pulses shaping based on the compensated symbol information sequence obtained by a nonlinear compensating apparatus to obtain a waveform of each pulse; and
a signal transmitter, configured to receive the waveform of each pulse transmitted by the pulse shaping unit, then modulating and transmitting the waveforms.

\* \* \* \* \*

UNITED STATES PATENT AND TRADEMARK OFFICE
CERTIFICATE OF CORRECTION

PATENT NO. : 8,891,669 B2  Page 1 of 1
APPLICATION NO. : 13/627563
DATED : November 18, 2014
INVENTOR(S) : Liang Dou et al.

It is certified that error appears in the above-identified patent and that said Letters Patent is hereby corrected as shown below:

On the Title Page
Column 1, Item [73] (Assignee), Line 1, Delete "Kawaski" and insert --Kawasaki--.

In the Specification
Column 1, Line 1, after "application" delete "is".

In the Claims
Column 22, Line 9, in claim 1, delete "item" and insert --item,--.
Column 23, Line 60, in claim 7, delete "where" and insert --where,--.
Column 23, Line 62, in claim 7, delete "e denotes" and insert --denotes--.
Column 23, Line 63, in claim 7, delete "item" and insert --item,--.
Column 24, Line 24, in claim 9, delete "transmitter," and insert --transmitter--.
Column 24, Line 51, in claim 9, delete "item" and insert --item,--.
Column 24, Line 53, in claim 9, delete "$(A^{m+n+5})*$" and insert --$(A^{m+n+k})*$--.

Signed and Sealed this
Eleventh Day of August, 2015

Michelle K. Lee
*Director of the United States Patent and Trademark Office*